(12) United States Patent
Ratcliffe

(10) Patent No.: US 7,811,163 B2
(45) Date of Patent: Oct. 12, 2010

(54) TRANSMITTER TAG

(76) Inventor: Ashley Ratcliffe, 28 Middlefield Lane, Hinckley, Leicestershire LE10 0RB (GB)

( * ) Notice: Subject to any disclaimer, the term of this patent is extended or adjusted under 35 U.S.C. 154(b) by 179 days.

(21) Appl. No.: 11/495,181

(22) Filed: Jul. 27, 2006

(65) Prior Publication Data

US 2007/0026968 A1 Feb. 1, 2007

Related U.S. Application Data

(63) Continuation-in-part of application No. 11/196,784, filed on Aug. 2, 2005, now abandoned.

(30) Foreign Application Priority Data

Jul. 27, 2005 (GB) .................................... 0515338

(51) Int. Cl.
*A63F 13/00* (2006.01)
(52) U.S. Cl. ........................... 463/3; 473/131; 473/140; 473/351
(58) Field of Classification Search .................. 473/353
See application file for complete search history.

(56) References Cited

U.S. PATENT DOCUMENTS

| | | | | |
|---|---|---|---|---|
| 3,782,730 A | * | 1/1974 | Horchler ..................... | 473/353 |
| 5,376,778 A | | 12/1994 | Kreft | |
| 5,447,314 A | * | 9/1995 | Yamazaki et al. ........... | 473/353 |
| 5,564,698 A | * | 10/1996 | Honey et al. ................ | 473/570 |
| 5,650,902 A | * | 7/1997 | Herkenrath et al. .......... | 361/13 |
| 5,708,411 A | | 1/1998 | Hill | |
| 5,771,441 A | * | 6/1998 | Altstatt ...................... | 455/66.1 |
| 5,777,570 A | | 7/1998 | Kobuku | |
| 6,544,041 B1 | * | 4/2003 | Damadian ................... | 434/262 |
| 6,634,959 B2 | * | 10/2003 | Kuesters .................... | 473/353 |
| 7,207,902 B1 | * | 4/2007 | Hamlin ...................... | 473/353 |
| 2002/0175807 A1 | | 11/2002 | Ashwin | |
| 2003/0111024 A1 | * | 6/2003 | Venturoli et al. ........... | 123/41 E |
| 2003/0111540 A1 | | 6/2003 | Hartmann | |

FOREIGN PATENT DOCUMENTS

| | | |
|---|---|---|
| DE | 42 05 556 A | 8/1993 |
| DE | 4205556 A | 8/1993 |
| DE | 20009198 U1 | 5/2000 |
| EP | 0735218 A | 10/1996 |
| EP | 0831414 A | 3/1998 |
| EP | 0911068 A1 | 4/1999 |
| FR | 2616335 A1 | 12/1988 |
| GB | 152866 A | 10/1978 |
| GB | 1528668 A | 10/1978 |
| WO | WO 00/23941 | 4/2000 |

* cited by examiner

*Primary Examiner*—John M Hotaling, II
*Assistant Examiner*—Jeffrey Wong
(74) *Attorney, Agent, or Firm*—Fulwider Patton LLP

(57) ABSTRACT

A transmitter tag for a ball, the tag comprises a transmitter configured to issue a signal for location of the ball, a power source for powering the transmitter, activation means operable for activating the transmitter when the ball is in use, and deactivation means operable for remote manual deactivation of the transmitter after the ball is located.

20 Claims, 3 Drawing Sheets

TRANSMITTER TAG

RELATED APPLICATIONS

This is a continuation-in-part of the U.S. application Ser. No. 11/196,784, filed Aug. 2, 2005 now abandoned, and claims priority from GB 0515338.2, filed Jul. 27, 2005.

The present invention relates to a transmitter tag, and more particularly but not limited to a transmitter tag for a golf ball.

Golf is a well known, and popular game in which a participant attempts to use a golf club to hit a golf ball into one of a series of holes in as few shots as possible. One issue associated with the game is the frequent loss of golf balls, which can occur. Lost or irretrievable balls result in the participant incurring penalty points thereby negating the objective of the game. Furthermore, the loss of balls adds to the financial cost of playing the game, and can result in a relatively large amount of much time being spent searching for the lost balls. The time spent searching for golf balls can also reduce the throughput of players on a golf course, thereby having a negative impact, not just on the participant, who has lost the ball but on other players also.

Solutions to help players locate golf balls have been proposed in the past. One such example comprises a golf ball, which flashes for a preset period after it has been struck. However, such systems rely on a line of sight between a player and the ball, which frequently isn't the case with lost balls. In order to conserve batteries the ball is designed to stop flashing after a relatively short period, typically 5 minutes or so. This means that if the ball is not located within that period the ball might not be found at all. Additionally, if the ball is located immediately after flashing is initiated, for example, on a putting green or the like, the flashing can be distracting either to the player taking the shot, or other players in the vicinity.

In another example, a golf ball is provided with an embedded passive radio frequency tag. The tag contains a microchip that responds to a signal transmitted from a locater device by returning a modified signal. The microchip has no independent power source, but instead operates off power taken from a carrier signal transmitted from the locator device. Thus, the device is inherently limited to a relatively short range (~9 m).

It is an object of the present invention to provide a transmitter tag, which mitigates at least one of the above issues.

According to one aspect of the present invention there is provided a transmitter tag for a ball, the tag comprising: a transmitter configured to issue a signal for location of said ball; a power source for powering said transmitter; activation means operable for activating said transmitter when said ball is in use; and deactivation means operable for remote manual deactivation of said transmitter after said ball is located.

Preferably said activation means comprises an impact switch operable to activate said transmitter in response to said ball being struck.

Preferably said deactivation means comprises a magnetic switch operable to deactivate said transmitter in response to the presence of a magnetic field.

Preferably said magnetic switch is a Hall effect switch.

Preferably said transmitter is configured for issuing a signal comprising a series of pulses modulated with a carrier signal. This may be a periodic on/off key modulated ultra high frequency carrier signal.

Preferably, said signal is allocated to a specific carrier frequency, said frequency being configurable to provide an identifier for identifying said ball.

Preferably said issued signal has a duty cycle of less than 1%.

Preferably each pulse has a width in the region of 200 μs, and wherein one pulse is issued in the region of every 60 ms.

Preferably said transmitter comprises an oscillator for producing said carrier signal.

Preferably said oscillator comprises a surface acoustic wave resonator.

According to another aspect of the present invention there is provided a golf ball comprising the transmitter tag.

Preferably said golf ball comprises a substantially spherical core embedded concentrically within said golf ball, wherein said tag is embedded in said core, and wherein said core, tag, and golf ball share substantially the same centre of mass.

An embodiment of the invention will now be described by way of example only with reference to the attached figures in which.

The invention has particular application for the location of golf balls. Hence, for the sake of clarity, the invention is described with particular reference to golf balls. It will be appreciated, however, that the invention has wider application than to golf balls alone.

Figure 1:
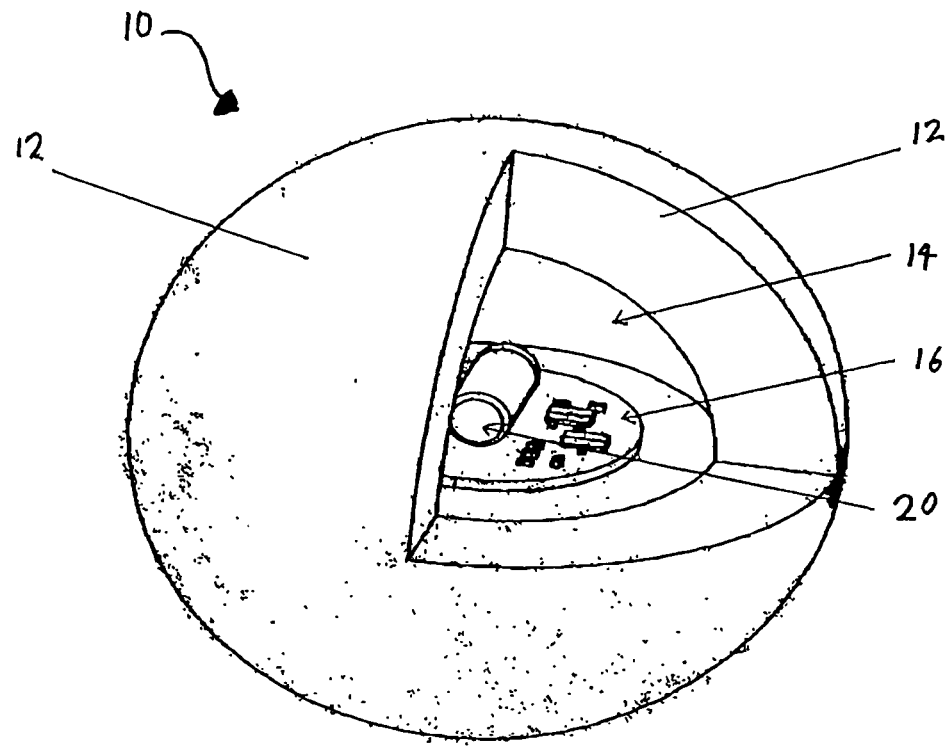
FIG. 1 shows a cut-away 3D view of a transmitter tag according to the invention, installed in a golf ball.

In FIG. 1 a golf ball having a transmitter tag is shown generally at 10. The golf ball comprises a shell portion 12, a core portion 14, and a tag 16.

The shell portion 12 generally comprises a hollow sphere of external dimensions and appearance corresponding to the standard requirements for golf balls. For example, at the time of filing the application, golf balls are required to have a minimum diameter of 1.68 inches. The external appearance may include, for example, the dimpled effect associated with maximising the distance that a ball of a particular weight will travel.

The core portion 14 is embedded for concentric centre of mass within the shell portion. The core 14 may be made of any material suitable for ensuring that the golf ball has a weight conforming to standard requirements, and for ensuring an acceptable balance and feel. For example, at the time of filing the application, golf balls are required to have a maximum weight of 1.62 ounces. An example of a suitable material for construction of the core portion 14 is a plastics material, such as polyurethane, whose density and other material characteristics (e.g. elasticity), may be manipulated to allow conformity of the golf ball both with appropriate rules, and with the expectations of players.

The materials of both the shell 12 and the core 14 are of sufficient durability, and resilient strength both to resist physical damage and/or deformity during the normal course of play, and to give the golf ball an acceptable lifespan.

The tag 16 is embedded for concentric centre of mass within the core. The tag 16 comprises a transmitter circuit configured for issuing a suitable signal for minimising power consumption while the transmitter is operational. In operation, the transmitted signal is received by a complementary receiver circuit, provided in a separate unit, for locating the transmitter tag and hence the golf ball in which it is embedded.

The shell 12, the core 14 and the tag 16 are further arranged to ensure compliance with rules concerning spherical symmetry, initial velocity, the overall distance standard and similar rules.

Figure 2:
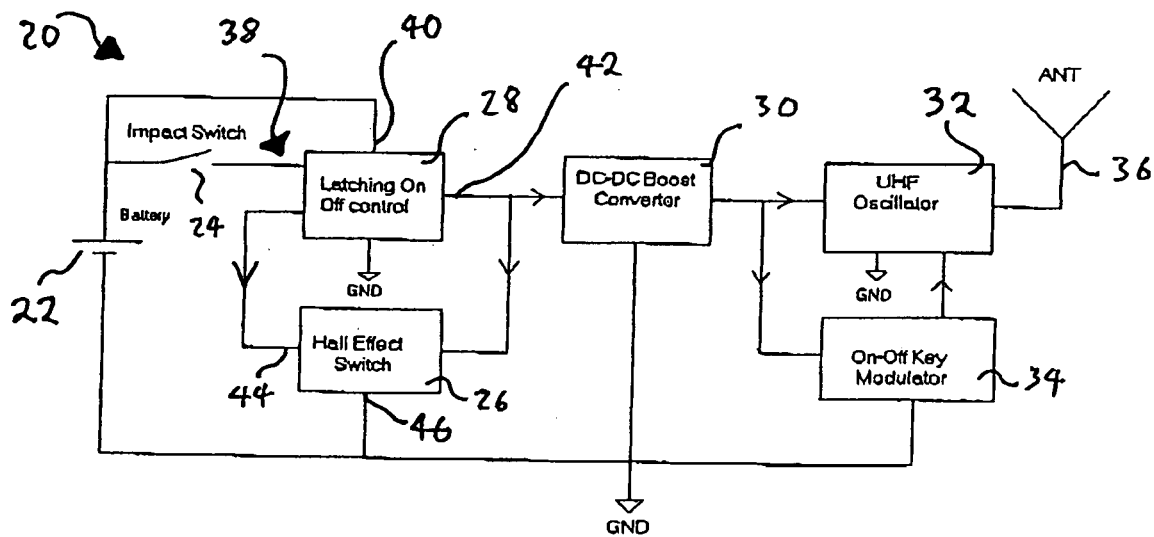
FIG. 2(a) is a block diagram of a first embodiment of the transmitter tag of FIG. 1.
FIG. 2(b) is a block diagram of a second embodiment of the transmitter tag of FIG. 1.

In FIG. 2(a) a first embodiment of a transmitter circuit, suitable for implementation in the transmitter tag 16, is shown generally at 20. The transmitter circuit 20 is operable to transmit an amplitude shift key modulated signal, comprising an ultra high frequency (UHF) signal modulated by a periodic series of on/off pulses to produce periodic UHF carrier bursts. Each pulse is relatively short, thereby resulting in a pulsed signal having a correspondingly low mark space ratio and the transmitted signal having an equivalent duty cycle. Typically, for example, the duty cycle is less than ~1%, the mark space ratio being less than ~0.01. A typical pulse length, for example, is ~200 μs for a period of 60 ms. Thus, the power consumption of the transmitter is minimised thereby prolonging battery life.

It will be appreciated that different tags may be provided with transmitter circuits in which the on/off keyed signal is allocated to a different carrier frequency. Similarly, the associated receiver may be configured for distinguishing between the frequencies thereby allowing a player to locate a ball having a specific identity. Thus, in a different embodiment of the invention, different frequencies could be used to identify different golf balls. The identification may be, for example, an electronic equivalent to the number printed on the side of a ball for visual identification purposes.

The transmitter circuit 20 comprises a power source 22, activation means 24, deactivation means 26, a latching portion 28, a boost portion 30, oscillator means 32, modulation means 34, and antenna means 36.

The power source 22, is a conventional battery or the like arranged for providing a working voltage to the latching portion 28, and the rest of the circuit. Typically, for example, the battery is a primary 3V lithium or the like.

The activation means 24 comprises a normally open switch, operable in the event of acceleration above a predefined level to switch temporarily from an open circuit or off state, to a short circuit or on state. Typically, for example, the switch comprises an impact, acceleration, or shock sensor, operable to switch temporarily from the off state, to the on state, in response to an acceleration between 1000 g and 5000 g, where g=9.8 m/s². The switch may additionally be hemispherically omni-directional.

The latching portion 28 comprises a gated switch or circuit having a gate terminal 38, an input terminal 40, and an output terminal 42. The latching portion 28 is operable to switch from a high impedance off state, between the input and output terminals 40, 42, to a low impedance on state, on the application of an appropriate voltage to the gate 38. The latching portion 28 is further operable to latch, on switching to the on state, thereby maintaining the low impedance state after the applied gate voltage is removed. In operation, the latched condition is maintained until a short-circuit condition exists between the gate 38 and ground.

The activation means 24 is connected between the power source 22, and the gate 38 of the latching portion 28. The input terminal 40 of the latching portion 28 is connected directly to the power source 22.

The deactivation means 26, comprises a first terminal 44 and a second terminal 46 connected respectively to the gate terminal 38 via an internal connection in the latching portion 28, and ground. The deactivation means 26 is operable to switch from a high impedance off state, to a low impedance on state, between the first and second terminals 44, 46, in the presence of a magnetic field of a suitable flux density. In the embodiment shown the deactivation means comprises a Hall effect switch, although it will be appreciated that other remotely influenced switching is possible.

The Hall effect switch comprises a micro-power omnipolar Hall effect switch. This allows a constant, polarity independent, magnetic field to be used to change the state of the hall switch. Hence, a simple, permanent magnetic source may be used to deactivate the device thereby reducing cost and complexity. A permanent magnet could, for example, be incorporated into the hand held receiver unit to allow for ball deactivation.

The Hall effect switch also incorporates an internally controlled clocking mechanism to cycle power to the Hall element and analogue processing circuits. The clocking mechanism serves to place the high current consuming portions of the circuit into a "Sleep" mode. Periodically the device is "Awakened" by internal logic, and the magnetic flux from the Hall element evaluated against predefined thresholds. If the flux density is above or below these thresholds then the output transistor is driven to change state accordingly. While in the "Sleep" cycle the output transistor remains latched in its previous state. Thus, the Hall effect switch is optimized for extended operating lifetime in battery powered systems.

Power for operation of the Hall effect switch 26 is provided, when the latching portion 28 is latched, from the output terminal 42. Thus, when the latching portion 28 is not latched the Hall effect switch 26 does not consume power.

Hence, in operation, when the golf ball is struck the activation means 24 switches to the on state, thereby activating the latching portion 28, such that the voltage at the output terminal 42 rises to that of the input terminal 40, where it is maintained due the latching action of the latching portion 28. Power is therefore supplied to the Hall effect switch 26, via the output terminal 42. Thus, when a magnetic field of suitable flux density is applied to the Hall effect switch 26, the deactivation means 26 switches to the on state thereby short-circuiting the gate 38 to ground via the latching portion 28, hence de-latching the latching portion 28. After de-latching the latching portion 28 switches back to the off state thereby isolating the output terminal 42 from the input terminal 40, and hence the power source 22.

The boost portion 30 comprises an input and an output, and is operable to boost the voltage applied to the input, to yield a higher working voltage at the output. In the embodiment shown the boost portion comprises a DC-DC boost converter suitable for providing a sufficient output voltage for driving the oscillator and modulation means 32, 34. Typically, for example, the voltage output is ~9V. It will be appreciated that alternatively, or additionally, additional voltage may be provided by providing at least one lithium power cell or the like, in addition to the power source 22.

The output terminal 42, of the latching portion 28 provides an input to the power boost portion 30. Hence, in operation, when the latching portion 28 is latched the voltage of the power source 22 is applied to the input of the boost converter 30, thereby resulting in a boosted voltage at the output.

The oscillator and modulator means 32, 34 are arranged for powering by the boosted voltage, in operation, when the latching portion is latched.

The oscillator means 32 comprises a UHF radio frequency oscillator configured for providing a predefined UHF carrier signal. The modulator means comprises an on/off key modulator arranged to modulate the carrier signal with a signal comprising a periodic series of on/off pulses. Thus, in operation the transmitter produces an associated on/off key modulated signal comprising UHF carrier bursts, which it then transmits via the antenna means 36.

The UHF oscillator 32 may comprise any suitable oscillator. Typically, for example, the oscillator comprises a single port surface acoustic wave (SAW) resonator operating at an appropriate frequency. The SAW resonator is particularly advantageous because it provides a good degree of frequency stability when subject to excessive mechanical shock of the type the golf ball is likely to receive during play. Typically, for example, a SAW resonator exhibits acceptable frequency stability at accelerations of the order 80000 g.

The antenna means comprises an omni-directional antenna operable to radiate the UHF carrier bursts in all directions.

Hence, in operation, when the golf ball is struck the activation means 24 switches to the on state, and the latching portion 28 latches thereby supplying the input of the boost converter, and Hall effect switch with power from the power source 22. Thus, the boost converter provides the boosted voltage to the oscillator 32 and the modulator 34 and thus the transmitter begins to transmit the on/off key modulated signal.

In order to switch off the transmitter, a user brings the ball into the proximity of a magnetic field, thereby activating the Hall effect switch to de-latch the latching portion, thereby isolating the boost converter. Thus, the transmission of UHF bursts is stopped and power consumption reduced substantially to zero.

Hence, the deactivation means is manually operable to deactivate the transmitter. It will be appreciated that in addition to the manually operable switch, the deactivation means may further comprise a time delay switch, which automatically switches off the transmitter after a pre-determined delay, thereby avoiding undue power loss in the unlikely event that the transmitter is accidentally switched on.

The transmitter circuit is designed to comply with appropriate statutory and other requirements such as, for example, FCC regulations.

Figure 2B:
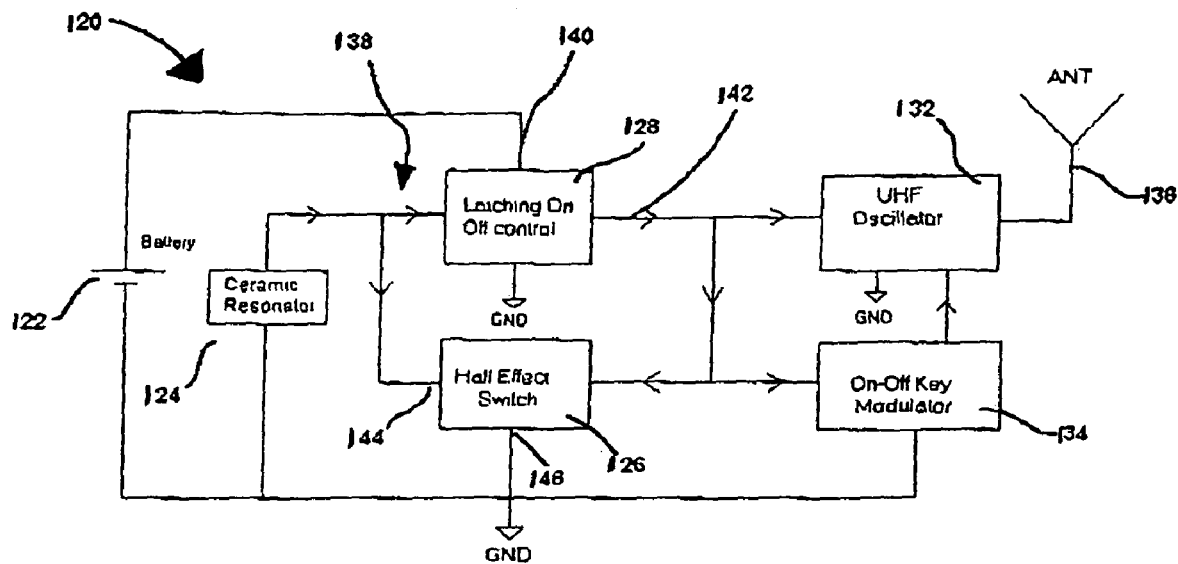

In FIG. 2(b) a second embodiment of a transmitter circuit, suitable for implementation in the transmitter tag 16, is shown generally at 120. The transmitter circuit 120 is similar to the circuit of FIG. 2(a) and will be described to highlight the main differences. Like the first embodiment the transmitter circuit 120 is operable to transmit an amplitude shift key modulated signal as generally described previously.

Like the transmitter circuit 20 the circuit 120 comprises a power source 122, activation means 124, deactivation means 126, a latching portion 128, oscillator means 132, modulation means 134, and antenna means 136. The circuit 120, however, does not include a boost converter arrangement, and the rest of the circuit is modified accordingly.

The absence of the DC-DC boost has the advantage of reduced complexity and cost, and is particularly advantageous for applications where the maximum finding range is limited to between ~50 m and 60 m.

The power source 122, latching portion 128, oscillator means 132, modulation means 134 and antenna means are generally arranged and configured as described with reference to FIG. 2(a) and will not be described again in detail.

As described previously, the latching portion 128 comprises a gated switch or circuit having a gate terminal 138, an input terminal 140, and an output terminal 142. Similarly, the deactivation means 126, comprises a Hall effect switch having a first terminal 144 and a second terminal 146 connected respectively to the gate terminal 138 of the latching portion 128, and ground.

In the absence of the boost converter, the oscillator and modulator means 132, 134 are powered directly from the output terminal 142, of the latching portion 128, when the latching portion is latched.

Furthermore, unlike the embodiment of FIG. 2(a), the activation means 124 comprises a standard ceramic resonator that uses the mechanical resonance of piezoelectric ceramics (generally, lead zirconium titanate or PZT) in order to produce the appropriate voltage at the gate 138 when subjected to a predefined level of acceleration. Typically, for example, the activation means 124 comprises a standard ceramic resonator configured to produce a voltage of sufficient amplitude to induce the required change in the impedance of the latching portion 128, in response to an acceleration between 1000 g and 5000 g where g=9.8 m/s$^2$. For example, the ceramic resonator may have a resonant frequency of 2 MHz to 16 MHz. The ceramic resonator may additionally be hemispherically omni-directional in X, Y and Z planes.

The activation means 124 is connected between ground and the gate terminal 138 of the latching portion 128. The input terminal 140 of the latching portion 128 is connected directly to the power source 122.

Hence, in operation, when the golf ball is struck the ceramic resonator 124 produces an appropriate voltage, thereby activating the latching portion 128, such that the voltage at the output terminal 142 rises to that of the input terminal 140, where it is maintained due the latching action of the latching portion 128. Power is therefore supplied to the Hall effect switch 126, via the output terminal 142. Thus, when a magnetic field of suitable flux density is applied to the Hall effect switch 126, the deactivation means 126 switches to the on state thereby short-circuiting the gate 138 to ground via terminals 144 and 146 of the Hall effect switch 126, hence de-latching the latching portion 128. After de-latching the latching portion 128 switches back to the off state thereby isolating the output terminal 142 from the input terminal 140, and hence the power source 122.

As described previously, the oscillator means 132 comprises a UHF radio frequency oscillator configured for providing a predefined UHF carrier signal. The modulator means 134 comprises an on/off key modulator arranged to modulate the carrier signal with a signal comprising a periodic series of on/off pulses.

Hence, in operation, when the golf ball is struck, the ceramic resonator 124 produces the required voltage at gate terminal 138, and the latching portion 128 latches thereby supplying the input of the Hall effect switch 126, the oscillator 132 and the modulator 134 with power from the power source 122. Thus the transmitter begins to transmit the on/off key modulated signal.

In order to switch off the transmitter, a user brings the ball into the proximity of a magnetic field, thereby activating the Hall effect switch 126 to de-latch the latching portion 128, thereby isolating the UHF oscillator 132, and the modulator 134 from the power source 122. Thus, the transmission of UHF bursts is stopped and power consumption reduced substantially to zero as described with reference to FIG. 2(a)

Figure 3:
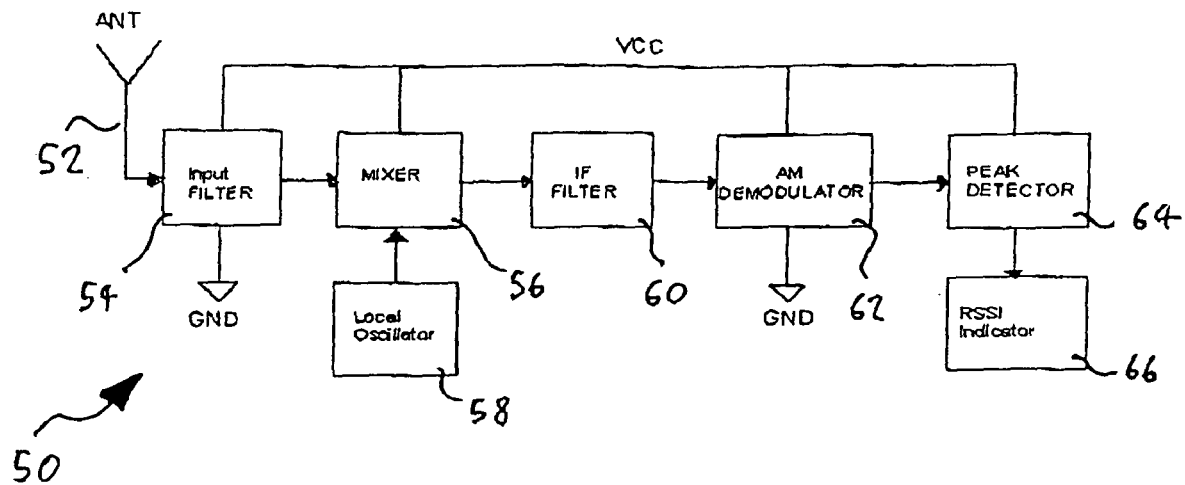
FIG. 3 is a block diagram of an Amplitude Shift Key Superheterodyne receiver for receiving signals transmitted from the transmitter tag of FIG. 1.

In FIG. 3 a receiver circuit for receiving the signal transmitted by the transmitter circuit of FIG. 2(a) or 2(b) is shown generally at 50. The receiver 50 is operable to receive the on/off key modulated signal, to recover the signal, and to provide an indication of its strength.

The receiver circuit 50 forms an amplitude shift key (ASK) superheterodyne receiver. Superheterodyne receivers are well known and hence the circuit will not be described in detail other than to further illustrate the invention.

The receiver 50 comprises, an antenna 52, a first filter portion 54, a mixer portion 56, a local oscillator portion 58, a second filter portion 60, a demodulator portion 62, peak detection means 64, and indicator means 66.

The antenna 52 is operable to receive the on/off key modulated signal transmitted by the golf ball. In the embodiment described the antenna 52 comprises an omni-directional antenna for reasons of practicality and cost efficiency. However, it will be appreciated that the antenna may alternatively be a directional antenna for assisting directional location of the golf ball emitting the modulated signal.

The first filter portion 54 comprises a band pass filter configured for filtering and amplifying the signal received by the antenna such that only the UHF frequency corresponding to the carrier of the modulated signal is amplified.

The oscillator means 58 comprises a UHF radio frequency oscillator configured for providing a second carrier signal. The mixer portion 56 is configured to heterodyne the filtered signal with the second carrier signal, produced by the oscillator portion 58, to generate a lower sideband at a beat frequency known as the intermediate frequency. The intermediate frequency is substantially equal to the difference between the frequencies of the second carrier and the carrier of the modulated signal.

The second filter portion 60 is configured to further filter and amplify the heterodyned signal for subsequent demodulation. The demodulator portion 62 is operable to amplitude demodulate the output of the second filter portion 60 to recover the on/off key encoded signal transmitted by the transmitter tag in the golf ball.

The peak voltage of the recovered signal is indicative of the signal strength of the received signal, and hence the distance of the golf ball containing the transmitter tag from the receiver. The peak detection means 64 comprises a peak detector operable to detect the peak voltage of the recovered on/off key encoded signal and to convert it into a corresponding DC voltage. The peak detection means 64 comprises a high impedance unity gain amplifier having a diode isolated output. The amplifier is configured to have a suitable bandwidth for the intended application. A parallel capacitor, resistor arrangement is connected to the amplifier, the arrangement having a time constant sufficient to convert the on/off key recovered signal into a DC voltage. The DC voltage is fed into a further high impedance unity gain amplifier thereby producing a buffered output suitable for driving the indicator means 66. The buffered DC voltage is thus indicative of the received signal strength, and hence the distance of the golf ball incorporating the transmitter tag from the receiver.

The indicator means 66 comprises means for providing a visual and/or audible indication of signal strength to a user.

The entire circuit is powered by an appropriate power source VCC.

Figure 4:
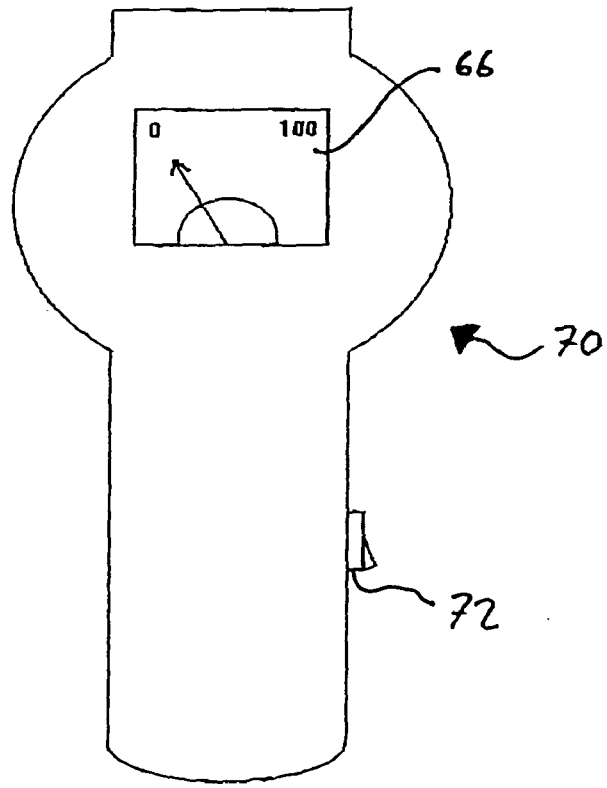
FIG. 4 show a hand held unit into which the Amplitude Shift Key Superheterodyne receiver of FIG. 3 may be incorporated.

An example of a typical hand held receiver unit is shown in FIG. 4 generally at 70. The receiver unit incorporates the receiver circuit 50 of FIG. 3 and a switch 72 for switching power to the circuit on and off as required. In the hand held unit of FIG. 4 the indicator means 66 is shown as an analogue coil indicator. It will be appreciated, however, that the indicator means may comprise any suitable means for indicating signal strength to the user. For example, the indicator means may alternatively or additionally comprise a digital display, an audible pitched output, an indicator bar or the like.

Hence, in operation, when a golf ball containing the transmitter tag is struck the tag begins transmitting an on/off key modulated signal. A user then uses the receiver unit 70 to pick up the transmitted signal and to give an indication of the associated received signal strength. The user then moves generally toward the area where he thinks the ball may have landed. If the indicator means 66 indicates that the signal strength is increasing the user knows that he is getting closer to the ball. On the other hand if the signal strength decreases the user knows that he is getting further away from the ball and can change direction accordingly. In this manner the user can find the ball quickly and easily without distracting other players.

After the ball is found the user deactivates the transmitter by putting a magnet of appropriate field strength near the golf ball. Conveniently, the golf ball may be provided with a storage container, of suitable dimensions for storing at least one golf ball, in which a suitable magnet is incorporated for ensuring that stored balls cannot start to transmit accidentally. Such a container would also mitigate against a user forgetting to deactivate the transmitter tag after finishing with the ball.

The use of a transmitter tag of the type described allows for a relatively large range, without contravening associated regulations, and without undue power consumption. Typically, for example, the transmitter tag of the second embodiment has a range in the region of 60 m, and a life span exceeding 200 hours in continuous operation.

The invention claimed is:

1. A transmitter tag for a golf ball, the tag comprising:
a transmitter configured to issue a location signal for location of said golf ball;
a power source for powering said transmitter;
activation means operable for activating said transmitter to switch to an on state in response to said golf ball being struck;
a latching portion connected to said activation means operable to switch from a high impedance off state to be latched in a low impedance on state when said activation means is switched to the on state; and
deactivation means comprising an omnipolar Hall effect switch operable when said latching portion is latched in the low impedance on state to deactivate said transmitter in response to the presence of a constant, polarity independent magnetic field;
wherein said transmitter further comprises a surface acoustic wave resonator for generating a transmitter carrier signal; and
said deactivation means incorporates a controlled clocking circuit for cycling power to a Hall element of said Hall effect switch thereby to reduce power consumption of said Hall effect switch.

2. A tag as claimed in claim 1 wherein said activation means comprises an impact switch operable to activate said transmitter in response to said ball being struck.

3. A tag as claimed in claim 2 wherein said impact switch is operable to produce a voltage depending on acceleration induced when the ball is struck.

4. A tag as claimed in claim 3 wherein said impact switch comprises a ceramic based resonator.

5. A tag as claimed in claim 1 wherein said Hall effect switch is a micropower omnipolar switch.

6. A tag as claimed in claim 1 wherein said Hall effect switch has an internal clocking mechanism.

7. A tag as claimed in claim 1 wherein said transmitter is configured for issuing a signal comprising a series of pulses modulated with a carrier signal.

8. A tag as claimed in claim 7 wherein said signal is allocated to a specific carrier frequency, said frequency being configurable to provide an identifier for identifying said ball.

9. A tag as claimed in claim 7 wherein said issued signal has a duty cycle of less than 1%.

10. A tag as claimed in claim 7 wherein each pulse has a width in the region of 200 μs, and wherein one pulse is issued in the region of every 60 ms.

11. A golf ball comprising a tag according to claim 1.

12. A golf ball according to claim 11, comprising a substantially spherical core embedded concentrically within said golf ball, wherein said tag is embedded in said core, and wherein said core, tag, and golf ball share substantially the same centre of mass.

13. A system for locating a golf ball, the system comprising:
a transmitter tag for a ball;
and a portable receiver for locating the transmitter tag;
wherein the tag comprises:
a transmitter configured to issue a signal for location of said ball;
a power source for powering said transmitter;
activation means operable for activating said transmitter to switch to an on state in response to said ball being struck;
a latching portion connected to said activation means operable to switch from a high impedance off state to be latched in a low impedance on state when said activation means is switched to the on state; and
deactivation means comprising an omnipolar Hall effect switch operable when said latching portion is latched in the low impedance on state to deactivate said transmitter in response to the presence of a constant, polarity independent magnetic field;
wherein said transmitter further comprises a surface acoustic wave resonator for generating a transmitter carrier signal; and
said deactivation means incorporates a controlled clocking circuit for cycling power to a Hall element of said Hall effect switch thereby to reduce power consumption of said Hall effect switch; and
the receiver comprises:
a receiver circuit configured to receive said signal; and
a signal peak detector configured to indicate the strength of said signal and therefore the distance of said transmitter tag from said receiver.

14. A system as claimed in claim 13 wherein said activation means comprises an impact switch operable to activate said transmitter in response to said ball being struck.

15. A system as claimed in claim 14 wherein said impact switch is operable to produce a voltage depending on acceleration induced when the ball is struck.

16. A system as claimed in claim 15 wherein said impact switch comprises a ceramic based resonator.

17. A system as claimed in claim 13 wherein said Hall effect switch is a micropower omnipolar switch.

18. A system as claimed in claim 13 wherein said Hall effect switch has an internal clocking mechanism for the purposes of reducing power consumption.

19. A system as claimed in claim 13 wherein said transmitter is configured for issuing a signal comprising a series of pulses modulated with a carrier signal.

20. A system as claimed in claim 19 wherein said signal is allocated to a specific carrier frequency, said frequency being configurable to provide an identifier for identifying said ball.

* * * * *